(12) United States Patent
Kim et al.

(10) Patent No.: US 12,040,464 B2
(45) Date of Patent: Jul. 16, 2024

(54) METHOD OF CONTINUOUSLY REGENERATING WASTE SEPARATOR INCLUDING INORGANIC PARTICLES

(71) Applicants: SK INNOVATION CO., LTD., Seoul (KR); SK IE TECHNOLOGY CO., LTD., Seoul (KR)

(72) Inventors: Yun Bong Kim, Daejeon (KR); Kyu Young Cho, Daejeon (KR); Jong Sang Park, Daejeon (KR); Hye Jin Lee, Daejeon (KR)

(73) Assignees: SK INNOVATION CO., LTD., Seoul (KR); SK IE TECHNOLOGY CO., LTD., Seoul (KR)

(*) Notice: Subject to any disclaimer, the term of this patent is extended or adjusted under 35 U.S.C. 154(b) by 0 days.

(21) Appl. No.: 18/193,408

(22) Filed: Mar. 30, 2023

(65) Prior Publication Data

US 2023/0318065 A1    Oct. 5, 2023

(30) Foreign Application Priority Data

Mar. 31, 2022   (KR) .................. 10-2022-0040303
Mar. 27, 2023   (KR) .................. 10-2023-0039710

(51) Int. Cl.
*H01M 10/54* (2006.01)
*H01M 50/403* (2021.01)
(Continued)

(52) U.S. Cl.
CPC ......... *H01M 10/54* (2013.01); *H01M 50/403* (2021.01); *H01M 50/431* (2021.01); *H01M 50/443* (2021.01); *H01M 50/446* (2021.01)

(58) Field of Classification Search
CPC .................................................... H01M 10/54
See application file for complete search history.

(56) References Cited

U.S. PATENT DOCUMENTS

| 2004/0034169 A1 | 2/2004 | Zhou et al. |
| 2009/0226813 A1 | 9/2009 | Takita et al. |

(Continued)

FOREIGN PATENT DOCUMENTS

| CN | 111403838 A | | 7/2020 |
| CN | 114006065 A | * | 2/2022 |

(Continued)

OTHER PUBLICATIONS

Office Action issued on Jun. 20, 2023 for U.S. Appl. No. 18/194,515.

(Continued)

*Primary Examiner* — Stephan J Essex
(74) *Attorney, Agent, or Firm* — IP & T GROUP LLP (57) ABSTRACT

Provided is a method of continuously regenerating a separator including inorganic particles. According to an embodiment of the present disclosure, a method of continuously regenerating a separator including inorganic particles including: impregnating a separator of which at least a part of the surface is coated with a coating layer including inorganic particles in a water tank, and then performing a surface polishing treatment to release the coating layer coated on the surface of the separator; and drying the separator from which the coating layer has been released may be provided.

16 Claims, 2 Drawing Sheets

(51) Int. Cl.
*H01M 50/431* (2021.01)
*H01M 50/443* (2021.01)
*H01M 50/446* (2021.01)

(56) References Cited

U.S. PATENT DOCUMENTS

2010/0084363 A1 4/2010 Michie, Jr. et al.
2017/0261131 A1 9/2017 Papillon et al.
2023/0398726 A1 12/2023 Kang et al.

FOREIGN PATENT DOCUMENTS

| KR | 10-1441031 B1 | 9/2014 |
| KR | 10-1490814 B1 | 2/2015 |
| KR | 10-2181876 B1 | 11/2020 |
| KR | 102323858 B1 | 11/2021 |
| WO | 2021202465 A1 | 10/2021 |

OTHER PUBLICATIONS

Office Action for the U.S. Appl. No. 18/194,515 issued by the USPTO on Nov. 14, 2023.
Extended European Search Report for the European Patent Application No. 23165765.1 issued by the European Patent Office on Feb. 19, 2024.

* cited by examiner

METHOD OF CONTINUOUSLY REGENERATING WASTE SEPARATOR INCLUDING INORGANIC PARTICLES

CROSS-REFERENCE TO RELATED APPLICATIONS

This application claims priority under 35 U.S.C. § 119 to Korean Patent Applications No. 10-2022-0040303, filed on Mar. 31, 2022, and No. 10-2023-0039710, filed on Mar. 27, 2023 in the Korean Intellectual Property Office, the disclosure of which is incorporated herein by reference in its entirety.

TECHNICAL FIELD

The following disclosure relates generally to a method of regenerating a separator such as a waste separator including inorganic particles. More particularly, the following disclosure relates to a method of continuously regenerating a separator such as a waste separator of which at least a part of the surface is coated with a coating layer including inorganic particles.

BACKGROUND

A separator is a fine film which blocks contact between a positive electrode and a negative electrode in a secondary battery used in electric vehicles, mobile phones, laptops, and the like to prevent electrical contact between electrodes, thereby increasing stability. Such separators may typically have pores of a size of several tens of nanometers, through which ions pass during operation of the secondary battery.

A commonly used separator employs a polyolefin-based membrane which may thermally shrink at high temperatures and thus has physically weak durability. Therefore, when an internal temperature rises due to the occurrence of a battery abnormality, the separator is easily deformed, and in serious cases, contact between electrodes may not be sufficiently prevented to cause explosion by a short.

To solve the stability problem as such, a ceramic coated separator (CCS) having an inorganic particle layer formed on one or both surfaces of a conventional polyolefin-based separator using inorganic particles has been developed.

As the demand for a ceramic coated separator having high heat resistance properties increases, various recycling methods, also referred to herein as regeneration methods, are being studied for reducing disposing the separators. The ceramic coated separator is difficult to chip and/or pelletize due to the inorganic particle layer on the surface, and even when extrusion is possible, a high load occurs in an extruder due to the high viscosity properties of a resin mixture. A method of adding an additive for lowering a viscosity was suggested, but the physical properties of a pellet manufactured by the above method are deteriorated by the additive, so that it is difficult to apply the pellet to various products.

Thus, an improved method for regenerating ceramic separators from secondary batteries will be highly desirable.

RELATED ART DOCUMENTS

Patent Documents (Patent Document 1) Korean Patent Registration No. 10-1441031 (notice date: Sep. 17, 2014)

SUMMARY

An embodiment of the present disclosure is directed to increase efficiency of a process of recycling a waste separator of a secondary battery and more particularly of a separator wherein at least a part of the surface of the separator is coated with a coating comprising inorganic particles. In some embodiments the inorganic particles may form one or more layers on at least a portion of the surface or surfaces of the separator.

The present disclosure aims to provide an improved recycling method for ceramic separators of secondary batteries which reduces or completely prevents any polymer material of the polymeric membrane of such separators having to be disposed.

It is another objective of the present disclosure to reduce the carbon footprint of the secondary batteries by providing environmentally friendly recycling of the polymeric separators used in such batteries.

It is another objective of the present disclosure to increase efficiency of a process of recycling of ceramic separators from secondary batteries.

According to a first aspect of the present disclosure, a method is provided of continuously regenerating a separator including inorganic particles. The method includes: impregnating a separator of which at least a part of the surface is coated with a coating layer including inorganic particles in a water tank, and then performing a surface polishing treatment to release the coating layer coated on the surface of the separator; and drying the separator from which the coating layer has been released.

In addition, according to an embodiment of the present disclosure, the releasing of the coating layer coated on the surface of the separator may further include sonication.

In addition, according to an embodiment of the present disclosure, the sonication may be performed under the condition of a frequency of 10 to 50 kHz.

In addition, the method of continuously regenerating a separator including inorganic particles according to an embodiment of the present disclosure may include one or more of the following (a) substrate and (b) brush as a surface polishing treatment means:

(a) a substrate having a woven fabric, a non-woven fabric, a calendered non-woven fabric, a polymer film, a stitch bonded fabric, an open cell foam, or a closed cell foam on the surface; and (b) a brush having an organic polymer fiber or an inorganic fiber as brush hair.

In addition, according to an embodiment of the present disclosure, the surface polishing treatment may include scrubbing the surface of the separator using one or two or more rolls of which at least a part of the surface has one or more of the substrate (a) and the brush (b).

In addition, according to an embodiment of the present disclosure, the drying of the separator may be performed at 50 to 150° C.

In addition, the method of continuously regenerating a separator including inorganic particles according to an embodiment of the present disclosure may further include washing the separator from which the coating layer has been released after releasing the coating layer coated on the surface of the separator.

In addition, according to an embodiment of the present disclosure, in the releasing of the coating layer coated on the surface of the separator, the separator is provided in a wound roll form, and the separator may be unwound from the provided roll and impregnated in a water tank.

In addition, the method of continuously regenerating a separator including inorganic particles according to an embodiment of the present disclosure may further include obtaining the released coating layer after releasing the coating layer coated on the surface of the separator.

In addition, the method of continuously regenerating a separator including inorganic particles according to an embodiment of the present disclosure may further include obtaining inorganic particles from the obtained coating layer.

In another aspect, a composition includes a coating layer obtained by the method of continuously regenerating a separator including inorganic particles described above.

In another aspect, a method of manufacturing a regenerated pellet includes: impregnating a separator of which at least a part of the surface is coated with a coating layer including inorganic particles in a water tank, and then performing a surface polishing treatment to release the coating layer coated on the separator; drying the separator from which the coating layer has been released; mixing the dried separator and a polyolefin-based resin; and melt-extruding the mixture of the separator and the polyolefin-based resin to manufacture a pellet.

In addition, according to an embodiment of the present disclosure, the releasing of the coating layer coated on the surface of the separator may further include sonication.

In addition, according to an embodiment of the present disclosure, the separator may be included at 10 to 90 wt % in the mixture based on the total weight of the mixture of the separator and the polyolefin-based resin.

In addition, according to an embodiment of the present disclosure, in the mixing of the dried separator and a polyolefin-based resin, a mixing temperature may be 50 to 500° C.

In addition, according to an embodiment of the present disclosure, in the melt-extruding of the mixture of the separator and the polyolefin-based resin to manufacture a pellet, the mixture of the separator and the polyolefin-based resin may be melt-extruded at 100 to 500° C.

In another general aspect, a regenerated pellet manufactured by the method of manufacturing a regenerated pellet described above according to an embodiment of the present disclosure is provided.

In another general aspect, a molded article manufactured by extruding or injecting the regenerated pellet manufactured as described above according to an embodiment of the present disclosure is provided.

The separator regeneration device according to an embodiment of the present disclosure includes an unwinder which unwinds a separator; a water tank to which the separator unwound from the unwinder is added; a polishing roller which is installed inside the water tank and polishes the surface of the separator; and a rewinder which winds the separator polished through the water tank, wherein the polishing roller is disposed to be accommodated in a liquid contained in the water tank, so that the surface of the separator is polished in the liquid.

The polishing roller may press the surface of the separator for pressurization.

The polishing roller may have a structure in which a sanding sponge is attached to the surface of a roll body.

The water tank may include a first water tank and a second water tank which are separated from each other, the polishing roller may be installed inside the second water tank, the separator unwound from the unwinder may be added to the first water tank so that the separator is immersed in a liquid contained in the first water tank, and the separator immersed in the first water tank may be added to the second water tank, so that the surface of the separator is polished by the polishing roller and washed simultaneously in a state of being immersed in the liquid contained in the second water tank.

The separator regeneration device may further include a dehydration unit which dehydrates the separator polished through the water tank and a drying unit which dries the separator dehydrated by the dehydration unit, which are installed between the water tank and the rewinder.

These and other features, aspects and advantages of the present disclosure will become apparent to the skilled person in this art from the following detailed description, drawings, and claims.

DETAILED DESCRIPTION OF EMBODIMENTS

Advantages and features of the present disclosure and methods to achieve them will be described from the embodiments described below in detail with reference to the accompanying drawings. However, the present disclosure is not limited to the embodiments disclosed below, and may be implemented in various other ways and forms. The following described embodiments of the present disclosure make a thorough disclosure of the present disclosure so that those skilled in the art can readily understand the present disclosure. However, the described embodiments are not intended to limit the scope of the present disclosure which is defined by the appended claims. Detailed description for carrying out the present disclosure will be provided with reference to the accompanying drawings below. Identical numerals in the various drawings refer to identical constituent elements.

Unless otherwise defined herein, all terms used in the specification (including technical and scientific terms) may have the meaning understood by those skilled in the art. Throughout the present specification, unless explicitly described to the contrary, "comprising" any elements will be understood to allow for further inclusion of other elements rather than the exclusion of any other elements. In addition, unless explicitly described to the contrary, a singular form may include a plural form herein.

In the present specification, it will be understood that when an element such as a layer, film, region, or substrate is referred to as being "on" or "above" another element, it can be "directly on" the other element or intervening elements may also be present.

In the present specification, a "separator" may refer to an off-spec separator produced during a process of manufacturing a separator, or a separator obtained in a recycling or disassembling process after collecting waste batteries or various waste electrochemical devices.

In the present specification, a "separator" may refer to a ceramic coated separator (CCS) in which at least a part of the surface of a polyolefin-based porous separator substrate is coated with a coating layer including inorganic particles.

The meaning of at least a part of the surface being coated with a coating layer may be a part or all of one or both surfaces being coated with the coating layer. The "coating layer" may include all compositions of the separator coating layer known in the art, and its components are not particularly limited.

According to an embodiment, the coating layer may include inorganic particles. As the inorganic particles, all inorganic particles known in the art may be used.

According to an embodiment, suitable examples of the inorganic particles may include alumina, aluminum hydroxide, silica, barium oxide, titanium oxide, magnesium oxide, magnesium hydroxide, clay, glass powder, boehmite, pseudo-boehmite, or a mixture thereof.

According to an embodiment, the inorganic particles may consist of alumina, aluminum hydroxide, silica, barium oxide, titanium oxide, magnesium oxide, magnesium hydroxide, clay, glass powder, boehmite, pseudo-boehmite, or any mixture thereof. The pseudo-boehmite is represented by the chemical formula $AlO(OH)$, and refers to a material which has a high moisture content and has a microcrystalline boehmite-like structure. In an embodiment, the inorganic particles are made of boehmite.

According to an embodiment, the coating layer may include a polymer binder. As the polymer binder, all binders known in the art may be used. In an embodiment the polymer binder may include one or more of acryl-based resins such as polymethylmethacrylate (PMMA), polybutylacrylate (PBA), and polyacrylonitrile (PAN), silane-based compounds such as (3-aminopropyl)triethoxysilane), (3-aminopropyl)trimethoxysilane, and (3-glycidyloxypropyl)trimethoxysilane), styrene butadiene rubber (SBR), carboxyl methyl cellulose (CMC), polyvinylprrolidone (PVP), and polyvinylaccetate (PVAc).

According to an embodiment of the present disclosure, a method of continuously regenerating a separator including inorganic particles is provided the method including: impregnating a separator of which at least a part of the surface is coated with a coating layer including inorganic particles in a water tank, and then performing a surface polishing treatment to release the coating layer coated on the surface of the separator; and drying the separator from which the coating layer has been released may be provided. Hereinafter, each process will be described in detail.

According to an embodiment of the present disclosure, a separator of which at least a part of the surface is coated with a coating layer including inorganic particles is impregnated in a water tank, thereby sufficiently wetting the separator, so that the coating layer coated on the surface of the separator may be released well in surface polishing treatment or sonication-surface polishing treatment.

According to an embodiment of the present disclosure, the water tank may be composed of one or two or more water tanks. According to a non-limiting example, when one water tank is included, the impregnation treatment-surface polishing treatment of the separator may be performed in the same water tank. According to another non-limiting example, when two or more water tanks are included, a water tank for impregnating the separator and a water tank for the surface polishing treatment of the separator may be separately formed. In addition, the process of washing the separator which is performed after the surface polishing treatment described later may be, according to a non-limiting example, performed in the same water tank as that for a surface polishing treatment, or in another water tank separate from that for a surface polishing treatment, and is not particularly limited.

According to an embodiment of the present disclosure, a water tank for impregnating the separator, a water tank for a surface polishing treatment of the separator, and a water tank for washing the separator may be separate different water tanks, respectively. When the impregnation treatment, the surface polishing treatment, and the washing are performed, respectively, in separate different water tanks, coating layer floating matter and the like released by the surface polishing treatment remain on or near the surface of the separator, and thus, possibilities of not sufficiently wetting the separator during the impregnation treatment, lowering release efficiency during the surface polishing treatment, or having an insufficient washing effect during washing may be prevented.

According to an embodiment of the present disclosure, an impregnation time required for sufficiently wetting the separator may be 10 seconds to 5 minutes. When the impregnation time is too short, the separator is not sufficiently wet, so that the coating layer may not be released well, and on the contrary, when the impregnation time is too long, process efficiency may be deteriorated. Considering the above point of view, the impregnation time may be preferably 10 seconds to 3 minutes, 10 seconds to 2 minutes, 30 seconds to 5 minutes, 30 seconds to 3 minutes, or 30 seconds to 2 minutes. The impregnation time during which the separator is impregnated may refer to, when the water tank in which the separator is impregnated is separately formed, a residence time of the separator in the water tank for impregnation, and when the impregnation treatment-surface polishing treatment is performed in the same water tank, a residence time of the separator in the water tank until the surface polishing treatment is performed.

Meanwhile, when the separator is impregnated in the treatment tank filled with an organic solvent and the like, not water, a chemical material is introduced into the organic solvent through pores in the separator, thereby causing contamination of the separator, which may affect the physical properties of the regenerated pellet manufactured from the separator. In addition, additional facilities for retreating the organic solvent and an explosion-proof facility are separately needed, and there may be problems such as human body damage and environmental pollution by volatilization of the organic solvent.

The separator is impregnated in the water tank, and subsequently, according to an embodiment of the present disclosure, the separator may be surface polished. The surface polishing treatment is sufficient as long as the surface is rubbed using various devices or instruments to release inorganic particles coated on the surface of the separator, and the surface polishing treatment means is not particularly limited. A non-limiting example of the surface polishing treatment means may be various devices or instruments including one or more of (a) a substrate having a woven fabric, a non-woven fabric, a calendered non-woven fabric, a polymer film, a stitch bonded fabric, an open cell foam, or a closed cell foam on the surface; and (b) a brush having an organic polymer fiber or an inorganic fiber as brush hair. In another embodiment, the surface polishing treatment means may be implemented as a polishing roller as described later.

The organic polymer fiber may be any fiber made of an organic polymer known in the art using a brush. As an of the organic polymer fiber, a fiber of one or a mixture of two or more of an ester-based fiber, a nylon-based fiber, a cellulose-based fiber, an acryl-based fiber, an olefin-based fiber, a natural fiber, and a polyvinylchloride-based fiber may be used.

The inorganic fiber may be any inorganic fiber known in the art using a brush. As a non-limiting example of the inorganic fiber, one or a mixture of two or more of a silicon carbide-based fiber, a carbon fiber, a metal oxide fiber, a metal nitride fiber, and a metal carbonitride fiber may be used.

Meanwhile, when a surface polishing treatment means having too high hardness is used to surface polish the separator, the separator may be torn, and inorganic particles may be incorporated into a torn space of the separator. Considering the above, it is necessary to appropriately adjust the hardness of the surface polishing treatment means. Without being limited thereto, among the surface polishing treatment means, the brush hair of the brush may have an R-scale Rockwell hardness of 80 to 140 or 90 to 130, as measured in accordance with ASTM D 786.

According to a non-limiting embodiment, the surface polishing treatment may include scrubbing the surface of the separator using one or two or more rolls of which at least a part of the surface has one or more of the substrate (a) and the brush (b) (scrubbing process).

According to an example of the present disclosure, the separator may be surface polished to release the coating layer coated on the surface, but according to an embodiment of the present application, in the process of releasing the coating layer coated on the surface of the separator, sonication may be further included.

According to an embodiment, the sonication may be performed before, simultaneously with, or after the surface polishing treatment, and the time to perform the process is not particularly limited. By the present disclosure, the sonication is performed in the water tank, thereby imparting ultrasonic vibration and rotation to water molecules in the water tank interposed between an instrument to perform the sonication and the separator to be treated, and the surface of the separator may be subjected to ultra-fine processing by the vibration and rotation of water molecules. A binding force between the separator and the coating layer may be lowered by the ultra-fine processing.

According to an embodiment of the present disclosure, the surface polishing treatment may be performed after performing the sonication. According to the present disclosure, when the sonication is first performed as a pretreatment, a binding force between the separator and the coating layer may be lowered, which may release the coating layer better from the separator, when the surface polishing treatment as a post-treatment is performed.

The instrument which performs the sonication is not particularly limited, but a non-limiting example may be an ultrasonic polishing device including an ultrasonic oscillator, a vibrator, and a horn.

According to an embodiment, the sonication may be performed at a frequency of 10 to 50 kHz, 10 to 40 kHz, or to 30 kHz.

According to an embodiment, the sonication may be performed under the conditions of an output of 300 to 1500 W, 300 to 1200 W, 300 to 1000 W, 500 to 1500 W, 500 to 1200 W, or 500 to 1000 W.

According to an embodiment, a sonication time may be 10 seconds to 5 minutes. When the sonication time is too short, a binding force between the separator and the coating layer may not be sufficiently lowered, and on the contrary, when the sonication time is too long, an effect of lowering a binding force between the separator and the coating layer may be saturated and process efficiency may be lowered. Considering the above point of view, according to an embodiment, a sonication time may be 10 seconds to 3 minutes, 10 seconds to 2 minutes, 30 seconds to 5 minutes, 30 seconds to 3 minutes, or 30 seconds to 2 minutes.

The method of continuously regenerating a separator including inorganic particles according to an embodiment of the present disclosure may include drying the separator from which the coating layer has been released.

According to an embodiment, the drying temperature of the separator may be 50 to 150° C., 50 to 120° C., or 50 to 100° C. Though a drying time is not particularly limited, according to an embodiment, it may be 30 minutes to 6 hours, 30 minutes to 3 hours, or 30 minutes to 2 hours.

Meanwhile, according to the present application, when the separator is surface polished in the water tank to release the coating layer coated on the surface of the separator, there is a possibility that the coating layer released from the separator remains near the surface of the separator.

The method of continuously regenerating a separator including inorganic particles according to an embodiment of the present disclosure may optionally further include washing the separator from which the coating layer has been released after releasing the coating layer coated on the surface of the separator.

As the washing process, all washing processes known in the art may be applied, but according to a non-limiting example, the washing may be performed using distilled water. In addition, the washing process may be performed in the same water tank as the water tank in which the surface polishing treatment is performed, or performed in another water tank different from the water tank in which the surface polishing treatment is performed, and is not particularly limited.

According to the present disclosure, a method of continuously regenerating a separator including inorganic particles may be provided. The process of continuously regenerating a separator is shown in FIG. 1

Figure 1:
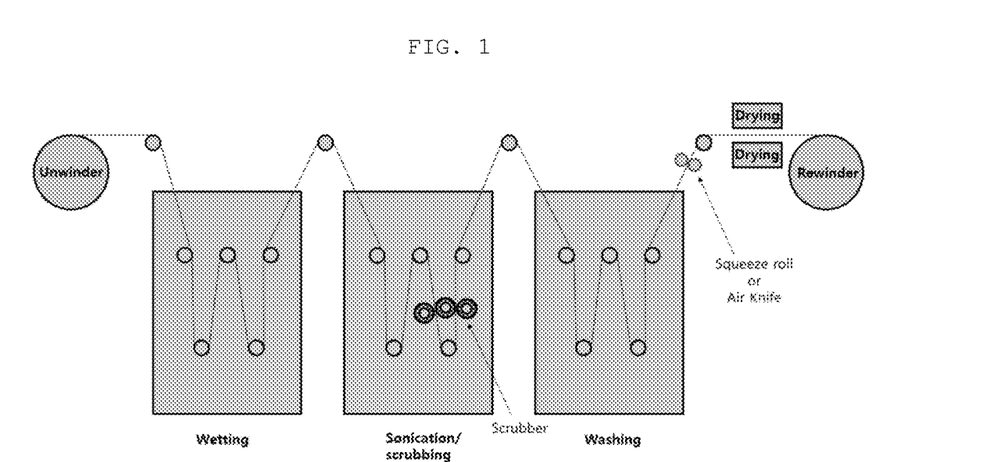
FIG. 1 is a simplified process diagram illustrating a continuous regeneration of a separator according to an embodiment of the present disclosure.

Referring to FIG. 1, according to an embodiment of the present disclosure, the separator may be provided in a wound roll form. Thereafter, the separator may be unwound from the provided roll and impregnated in the water tank. The separator is impregnated in the water tank and sufficiently wetted, and may be subjected to a surface polishing treatment alone or a combination of sonication-surface polishing treatment in the water tank. In FIG. 1, the sonication and the surface polishing treatment are illustrated to be performed in the same water tank; however, it is understood that they may be also performed in separate water tanks. The separate water tanks may be of the same type and size or may be different from each other.

The surface polishing treatment may include a process of scrubbing the surface of the separator with one or two or more rolls of which at least a part of the surface has one or more of (a) a substrate and (b) a brush. Since the substrate (a) and the brush (b) may have the configurations as described above, the description will be omitted for convenience.

The sonication may be performed with the surface polishing treatment in combination in a regeneration line, but is not particularly limited. According to an example, the surface polishing treatment may be performed after performing the sonication. According to an embodiment, during the sonication, a frequency may be 10 to 50 kHz, 10 to 40 kHz, or 10 to 30 kHz, and an output may be 300 to 1500 W, 300 to 1200 W, 300 to 1000 W, 500 to 1500 W, 500 to 1200 W, or 500 to 1000 W.

Inorganic particles coated on the surface of the separator are released by the overall process, and then a process of washing the separator from which the coating layer has been released may be performed. The washing process may be performed using distilled water.

A process of drying the washed separator may be subsequently performed. According to an embodiment, a drying temperature may be 50 to 150° C., 50 to 120° C., or 50 to 100° C. While a drying time is not particularly limited, according to an embodiment, it may be 30 minutes to 6 hours, 30 minutes to 3 hours, or 30 minutes to 2 hours.

Thereafter, the regenerated separator may be wound again if necessary. However, in one embodiment, the regenerated separator may not be wound.

In addition, the method of continuously regenerating a separator including inorganic particles according to an embodiment of the present application may further include obtaining the released coating layer after releasing the coating layer coated on the surface of the separator.

The process of obtaining the released coating layer is sufficient if it is performed simultaneously with or after the process of releasing the coating layer coated on the surface of the separator, and may be performed before or after the process of washing the separator or the process of drying the separator as described above.

The obtained coating layer may include one or more of inorganic particles, moisture, and organic matter. According to an example, the organic matter may be derived from a polymer binder contained in the coating layer, but is not particularly limited. In addition, according to an example, the mixture may have a slurry form, but is not particularly limited.

Since the coating layer released in the water tank has a high moisture content, it is necessary to appropriately remove moisture considering water of a product applied later. Considering the fact, according to an embodiment, the process of obtaining the released coating layer may include removing moisture from the released coating layer using a filter press or the like and then drying the coating layer.

According to another embodiment, the process of obtaining the released coating layer may include adding a coagulant into the water tank including the released coating layer to dry a settled precipitate.

According to an embodiment of the present disclosure, a composition including the coating layer obtained as described above may be provided. Since the obtained coating layer may be included as a component of a coating material such as a paint, a filler, and the like, as a composition including one or more of inorganic particles, moisture, and an organic substance, its industrial advantages are excellent.

In addition, the method of continuously regenerating a separator including inorganic particles according to an embodiment of the present application may further include obtaining inorganic particles from the obtained coating layer.

The process of obtaining inorganic particles from the obtained coating layer may remove moisture and/or organic matter contained in the coating layer by drying or heat treatment.

According to an embodiment of the present disclosure, inorganic particles obtained from the obtained coating layer may be provided. Since the obtained inorganic particles may be used in various industrial fields such as a cement composition, a catalyst support, an adsorbent, a semiconductor substrate, and an LED phosphor, as well as for a separator coating agent of an electrochemical device, their industrial advantages are excellent.

According to an embodiment of the present application, a separator regenerated according to one method of the methods of continuously regenerating a separator described above may be provided. The regenerated separator may be a polyolefin-based porous separator substrate from which a coating layer including inorganic particles coated on at least a part of the surface has been released, and may be recycled later as a separator of an electrochemical device.

Since the method of regenerating a separator according to the present disclosure may release most of the coating layer including inorganic particles coated on the surface of the separator by a process such as a surface polishing treatment alone or a combination of sonication and surface polishing treatment in the water tank after impregnating the separator in the water tank, its industrial advantages are excellent.

The method of regenerating a separator according to the present disclosure has excellent industrial advantages, since a continuous process may be applied to the method and the method may efficiently regenerate a large amount of the separator.

By the method of continuously regenerating a separator including inorganic particles according to an embodiment of the present disclosure, the separator of which at least a part of the surface is coated with a coating layer including inorganic particles may be regenerated to provide a released coating layer, inorganic particles obtained from the released coating layer, and/or a regenerated separator, and thus, the industrial advantages are excellent.

According to the present application, a method of manufacturing a regenerated pellet including: impregnating a separator of which at least a part of the surface is coated with a coating layer including inorganic particles in a water tank, and then performing a surface polishing treatment to release the coating layer coated on the separator; drying the separator from which the coating layer has been released; mixing the dried separator and a polyolefin-based resin; and melt-extruding the mixture of the separator and the polyolefin-based resin to manufacture a regenerated pellet may be provided.

According to an embodiment of the present application, the process of releasing the coating layer coated on the surface of the separator may further include sonication.

According to an embodiment of the present disclosure, a process of washing the separator from which the coating layer has been released may be further included after releasing the coating layer coated on the surface of the separator.

Since the details of the process of releasing the coating layer including inorganic particles, the process of drying the separator from which the coating layer has been released, and the process of washing the waste separator are as described in the method of continuously regenerating a separator described above, they will be omitted for convenience. According to an embodiment of the present invention disclosure, the dried separator and a polyolefin-based resin may be mixed. The polyolefin-based resin may be a new polyolefin-based resin, but is not necessarily limited thereto. As the mixing process, all mixing processes known in the art may be applied, and the process may be performed using a kneader. An example of the kneader may be one of a single screw or multi screw kneader, a Banbury mixer, an internal mixer, a Labo Plastomill, and a roll kneader, or a combination thereof.

The mixing temperature according to an embodiment may be 50 to 500° C., 50 to 400° C., or 50 to 300° C.

A running time of the mixing process according to an embodiment may be more than 0 minutes and 30 minutes or less, more than 0 minutes and 20 minutes or less, or more than 0 minutes and 10 minutes or less.

When the mixing process is performed using a kneader provided with a rotor, according to an embodiment, a rotational speed may be 10 to 500 rpm, 10 to 300 rpm, or 10 to 100 rpm.

Following the mixing process, according to an embodiment of the present disclosure, a process of melt-extruding a mixture of the separator and the polyolefin-based resin to manufacture a regenerated pellet may be performed. In terms of the melt extrusion process, all melt extrusion processes known in the art may be applied, and the process may be performed using an injection machine, or any other process deemed suitable. An example of the injection machine may include a plunger type injection machine, a screw type injection machine, or a combination thereof.

In one embodiment, the separator may be included in the mixture at 10 to 90 wt %, 10 to 80 wt %, or 10 to 70 wt %, based on the total weight of the mixture of the separator and the polyolefin-based resin. When the pellet is manufactured within the composition range described above, its physical properties may be superior to those of the pellet having a composition of polyolefin-based resin alone.

In another embodiment, the mixture of the separator and the polyolefin-based resin may be melt-extruded at 100 to 500° C., 100 to 400° C., 100 to 300° C., 150 to 500° C., 150 to 400° C., or 150 to 300° C.

According to an embodiment of the present disclosure, a regenerated pellet manufactured according to the method of manufacturing a regenerated pellet described above may be provided. Since the regenerated pellet has physical properties similar to those of a new polyolefin resin, it may be used in various industrial fields using a conventional new polyolefin resin as the raw material of a product.

In addition, according to the present disclosure, a molded article manufactured by extruding or injecting the regenerated pellet manufactured as described above may be provided. A non-limiting example of the molded article may include molded articles such as cases, films or sheets, shoes, clothing such as shoes and clothes, and plastic products in various industrial fields. An example of the films may include a separator of an electrochemical device.

Hereinafter, the examples and the comparative examples of the present disclosure will be described.

EXAMPLES

Evaluation Example 1: Evaluation of Coating Release Rate Depending on Whether a Process of Releasing a Coating Layer (Surface Polishing Treatment/Sonication) was Performed Specimen A
(Preparation of Coating Solution)

94 wt % of boehmite (γ-AlO(OH)) particles having an average particle diameter of 0.7 μm, 4 wt % of acrylic latex having Tg of −52° C., and 2 wt % of polyvinylpyrrolidone (PVP), based on the total weight of a coating solution were added to water as a solvent, and stirring was performed to prepare a coating solution slurry.

(Manufacture of Separator]

A polyolefin microporous separator (SK ENPASS) having a thickness of 11 μm and a unit weight of 5.9 g/m² was used as a separator substrate, both surfaces were bar coated with the coating solution slurry prepared above at a thickness of 5 μm, respectively, and then dried, and winding into a roll form was performed to prepare a ceramic coated separator (CCS) of which at least a part of the surface is coated with a coating layer including inorganic particles. At this time, the separator wound in a roll form was unwound, and then was cut into a width of 10 cm×a length of 10 cm to prepare a specimen.

Specimen B

A separator was manufactured under the same conditions as Specimen A, except that 95 wt % of boehmite (γ-AlO(OH)) particles having an average particle diameter of 0.7 μm and 5 wt % of an acrylic latex having Tg of 60° C., based on the total weight of a coating solution were added to water as a solvent, and stirring was performed to prepare a coating solution slurry.

Specimens A and B were impregnated in a water tank, a process of releasing a coating layer was performed under the conditions listed in the following Table 1, and the results are shown together in the following Table 1.

In Table 1, "surface polishing treatment" was performed by impregnating Specimens A and B in the water tank for 60 seconds and scrubbing the entire surface of the specimen 2 times clockwise with a scrubbing cloth. The scrubbing cloth was a polyester wiper product of WW-3012 available from KM.

In Table 1, "sonication" was performed by sonicating for 60 seconds with a sonication horn under the conditions of 20 kHz and 750 W in a water tank.

In Examples 3 and 4 in which both the surface polishing treatment and the sonication were performed in Table 1, the sonication was first performed in the water tank, and then the surface polishing treatment was performed immediately.

After performing the process of releasing a coating layer, each of the separators of Examples 1 to 4 and Comparative Examples 1 and 2 in Table 1 was washed with distilled water, and then dried in an oven at 80° C. for 1 hour.

The "coating release rate (%)" in the following Table 1 was calculated by the following equation:

$$\text{Coating release rate (\%)} = (\text{weight of initial separator} - \text{weight of final separator})/(\text{weigh of coating layer before release}) * 100$$

The "weight of initial separator," which is the weight of a separator which is not subjected to the process of releasing a coating layer according to Table 1, is the weight of the separators manufactured in Specimens A and B.

The "weight of final separator" is the weight of the separators of Examples 1 to 4 and Comparative Examples 1 and 2 after performing the processes of releasing, washing, and drying the coating layer according to Table 1.

The "weight of coating layer before release" is a weight obtained by subtracting 0.059 g which is the weight of the separator before coating from the weight of initial separator. The weight of the separator before coating, 0.059 g was calculated from the unit weight of the polyolefin microporous separator (SK ENPASS) of 5.9 g/m² and the area of the specimen, 100 cm².

TABLE 1

| | Type of specimen | Process of releasing coating layer | | Weight of initial separator (g) | Weight of final separator (g) | Weight of coating layer before releasing (g) | Coating release rate (%) |
| --- | --- | --- | --- | --- | --- | --- | --- |
| | | Whether surface polishing treatment was performed (o/x) | Whether sonication was performed (o/x) | | | | |
| Example 1 | A | o | x | 0.221 | 0.0606 | 0.162 | 99.0 |
| Example 2 | B | o | x | 0.193 | 0.0657 | 0.134 | 95.0 |
| Example 3 | A | o | o | 0.218 | 0.0601 | 0.159 | 99.3 |
| Example 4 | B | o | o | 0.195 | 0.0631 | 0.136 | 97.0 |
| Comparative Example 1 | A | x | o | 0.221 | 0.0946 | 0.162 | 78.0 |
| Comparative Example 2 | B | x | o | 0.193 | 0.1072 | 0.134 | 64.0 |

Referring to the results of Table 1, it was confirmed that since the coating release rate in Examples 1 to 4 in which the surface polishing treatment was performed in the water tank was 90% or more, the coating layer coated on the surface of the separator was released well. In particular, in Examples 3 and 4, it was confirmed that by performing the sonication and then the surface polishing treatment, a coating release rate was higher than that of Examples 1 and 2, and thus, the coating layer coated on the surface of the separator was released better.

However, in Comparative Examples 1 and 2, as a result of performing only the sonication, a coating release rate was less than 80%, and thus, the coating layer was not sufficiently released by the process of releasing a coating layer and remained in a large amount on the surface of the separator.

Evaluation Example 2: Evaluation of Physical Properties of Regenerated Pellet The separator of Example 1 which was subjected to the process of releasing a coating layer in Evaluation Example 1 and then washed and dried or the separator of Specimen A which was not subjected to the process of releasing a coating layer were added to a Brabender mixer (internal mixer) with a high density polyethylene (HDPE) at the ratio listed in the following Table 2, and mixing was performed at 200° C. at 40 rpm for 5 minutes. The mixture was melt-extruded at 190° C. with the equipment of a Wabash Compressor molder to manufacture a regenerated pellet. The physical properties of the manufactured pellet were evaluated, and then the evaluation results are shown in the following Table 2. In the following Table 2, "Ref." is a pellet having a composition of a high density polyethylene alone for evaluating the physical properties of the examples and the comparative examples.

TABLE 2

| | Mixing condition | | | Yield strength (kgf/cm$^2$) | Elongation (%) | Young's modulus (kgf/cm$^2$) | Impact strength (kJ/m$^2$) |
| --- | --- | --- | --- | --- | --- | --- | --- |
| | Mixing ratio | | | | | | |
| | HDPE (wt %) | Separator (wt %) | Separator type | | | | |
| Ref. | 100 | 0 | — | 242 | 828 | 11300 | 20 |
| Example 5 | 80 | 20 | Example 1 | 241 | 818 | 10800 | 20 |
| Example 6 | 70 | 30 | Example 1 | 243 | 797 | 11200 | 20 |
| Comparative Example 3 | 70 | 30 | Specimen A | 232 | 39 | 12100 | 15 |

Referring to the results of Table 2, in Examples 5 and 6, it was confirmed that the coating layer including inorganic particles was released well on the surface of the separator to secure an equivalent level of physical properties to Ref. having a composition of a high density polyethylene alone.

However, in Comparative Example 3, since the coating layer including inorganic particles remained on the surface of the separator, the yield strength and the elongation were lower than those of Examples 5 and 6, and thus, elasticity was poor and impact strength was low.

Hereinafter, the separator regeneration device of the present disclosure will be described.

Referring to FIG. 1 again, schematically, the device of the present disclosure unwinds the separator provided in a wound roll adds the unwound separator to a water tank, performs regeneration processes such as wetting, scrubbing, and washing, and performs winding.

Figure 2:
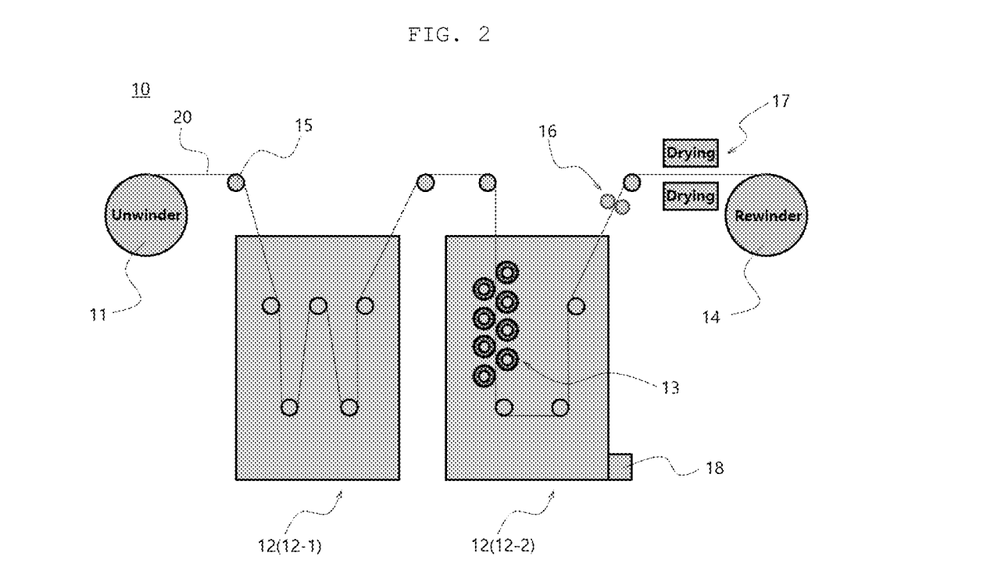
FIG. 2 is a simplified schematic diagram of a separator regeneration device according to an embodiment of the present disclosure.

FIG. 2 is a schematic diagram of the separator regeneration device according to an embodiment of the present disclosure. The separator regeneration device 10 includes an unwinder 11 which unwinds a separator 20, a water tank 12 in which a liquid is contained and the separator is added thereto, and a rewinder 14 which winds the separator through the water tank 12 and includes a plurality of guide rollers 15 for transferring the separator between the unwinder 11 and the rewinder 14.

In the present device 10, a polishing roller 13 is installed inside the water tank 12, and the corresponding polishing roller 13 is disposed to be accommodated in the liquid contained inside the water tank 12. The polishing roller 13 may be composed of multiple rollers. The polishing roller 13 has a rough surface to scrub and polish the surface of the separator, and thus, the separator may be polished in a state of being immersed in the liquid. As such, by polishing the separator in a liquid, the damage of the separator may be decreased and polishing performance may be improved. FIG. 2 shows a first tank 12(12-1) and a second tank 12(12-2) which are described in more detail below.

Figure 3:
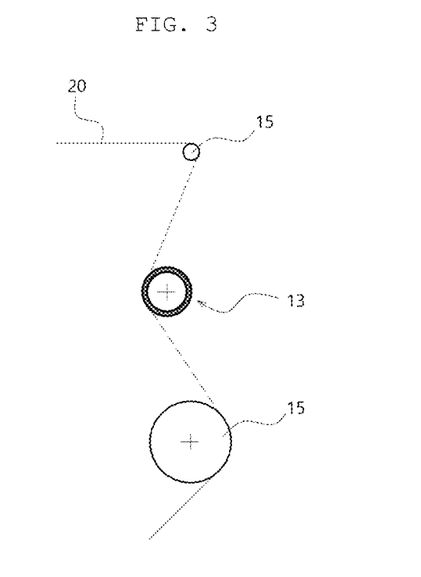
FIG. 3 is a simplified schematic diagram showing a layout structure of a polishing roller according to an embodiment of the present disclosure.

Here, the polishing roller 13 may be disposed to press the separator, so that the polishing roller 13 pressurizes the separator. FIG. 3 is a drawing schematically showing the layout structure of the polishing roller according to an embodiment of the present disclosure, and as shown in the drawing, it may be configured in the layout structure in which the polishing roller 13 is disposed so as to protrude toward the separator as compared with the guide roller 15 disposed at the front and rear of the polishing roller 13, so that the separator wraps around the polishing roller 13 in an S shape (S-wrap). Accordingly, the polishing roller 13 presses the separator from top to bottom or from front to back to pressurize the separator. As such, since the polishing roller 13 pressurizes the separator, adhesion between the polishing roller 13 and the separator is increased to increase polishing performance.

The present device 10 may include a plurality of polishing rollers 13, and the plurality of polishing rollers 13 may be configured in a structure in which the layout structure of FIG. 3 is installed in series. Here, though not shown, another polishing roller is disposed instead of the guide roller on at least one side of the front and back of any one polishing roller, and the corresponding adjacent two or more polishing rollers are disposed in zigzags with each other, so that the adjacent polishing rollers may be configured in an S-shaped layout structure.

Figure 4:
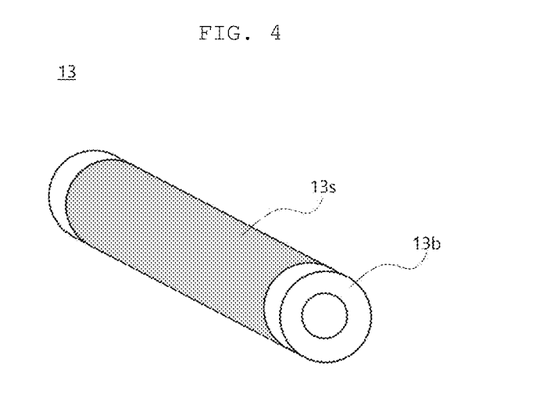
FIG. 4 is a simplified schematic diagram showing an example of a polishing roller.

Meanwhile, the polishing roller 13 may be configured in a structure in which a sanding sponge 13s is attached to the surface. FIG. 4 shows the polishing roller, and the polishing roller 13 may be formed in a structure in which the sanding sponge 13s is attached to the surface of a roll body 13b, in which the sanding sponge 13s may be attached using an internal adhesive tape. The roughness of the sanding sponge 13s may be appropriately selected. Since the polishing roller 13 is configured as such, it is easy to attach and detach the sanding sponge 13s, thereby providing convenience in installation and management, and based on the fact, the roughness of the polishing roller 13 may be easily changed. One or two or more polishing rollers 13 may be installed, and the roughness of each polishing roller 13 may be configured to be the same or different.

In addition to the structure in which the sanding sponge 13s is attached to the surface of the roll body 13b, the polishing roller 13 may be composed of various devices or instruments including one or more of (a) a substrate having a woven fabric, a non-woven fabric, a calendered non-woven fabric, a polymer film, a stitch bonded fabric, an open cell foam, or a closed cell foam on the surface; and (b) a brush having an organic polymer fiber or an inorganic fiber as brush hair, as a non-limiting example, as described above. Since the organic polymer fiber and the inorganic fiber are as described above, their descriptions will be omitted for convenience.

Referring to FIG. 2 again, the water tank 12 may be composed of a first water tank 12-1 and a second water tank 12-2 separately, and the polishing roller 13 may be installed in the second water tank 12-2. The reason for configuring the water tank 12 separately as such is that the functions of each water tank 12 are different, and the separator may be immersed in the first water tank 12-1 and the separator may be polished and washed in the second water tank 12-2.

More specifically, the separator unwound from the unwinder 11 is added to the first water tank 12-1 and is sufficiently immersed in the liquid contained in the first water tank 12-1, and the separator immersed in the first water tank 12-1 is added to the second water tank 12-2 and may be surface polished and washed by the polishing roller 13 in a state of being immersed in the liquid contained in the second water tank 12-2. Since the liquid of the first water tank 12-1 and the liquid of the second water tank 12-2 have different levels of contamination depending on the use, their replacement cycles may be different from each other, considering the fact that the water tank 12 is separately formed, thereby providing an optimized design of the device and reducing maintenance costs.

Meanwhile, as shown in FIG. 1, three water tanks are separately formed, so that a final washing function may be further performed in a third water tank as the final water tank. In this case, though there is an advantage of improving a washing function, the total volume of the device is increased, and thus, the design may be appropriately changed according to the situation.

Referring to FIG. 2 again, a dehydration unit 16 and a drying unit 17 may be installed between the water tank 12 and the rewinder 14. The dehydration unit 16 dehydrates moisture of the separator from the water tank 12 and may be composed of a dehydration device such as a squeeze roll or an air knife, and the drying unit 17 dries the separator dehydrated through the dehydration unit 16 and may be composed of a drying device such as a dryer.

Furthermore, as described above, an additional polishing process may be performed in combination using ultrasonic waves in addition to the polishing roller 13 for polishing the surface of the separator, and an ultrasonic generator 18 therefor may be installed close to the water tank 12, more specifically the second water tank 12-2.

By the method of continuously regenerating a separator including inorganic particles according to an embodiment of the present application, the separator of which at least a part of the surface is coated with a coating layer including inorganic particles may be regenerated to provide a released coating layer, inorganic particles obtained from the released coating layer, and/or a regenerated separator, and thus, the industrial advantages are excellent.

The method of continuously regenerating a separator including inorganic particles according to an embodiment of the present invention may provide a coating layer released from the separator. Since the released coating layer may be included as a component of a coating material such as a paint, a filler, and the like, as a composition including one or more of inorganic particles, moisture, and an organic substance, its industrial advantages are excellent.

The method of continuously regenerating a separator including inorganic particles according to an embodiment of the present disclosure may provide inorganic particles obtained from the coating layer released from the separator. The obtained inorganic particles may be used in various industrial fields such as a cement composition, a catalyst support, an adsorbent, a semiconductor substrate, and an LED phosphor, as well as for a separator coating agent of an electrochemical device.

The method of continuously regenerating a separator including inorganic particles according to an embodiment of the present invention may provide a regenerated separator. The regenerated separator may be a polyolefin-based porous separator substrate from which a coating layer including inorganic particles coated on at least a part of the surface has been released, and may be recycled later as a separator of an electrochemical device.

Since the method of regenerating a separator according to an embodiment of the present application may release most of the coating layer including inorganic particles on the surface of the separator by a relatively simple process such as a surface polishing treatment alone or a combination of sonication and surface polishing treatment after impregnating the separator in the water tank, its industrial advantages are excellent.

The method of regenerating a separator according to an embodiment of the present invention has excellent industrial advantages, since a continuous process may be applied to the method and the method may efficiently regenerate a large amount of the separator.

By the method of manufacturing a regenerated pellet according to an embodiment of the present invention, a regenerated pellet manufactured using a separator of which at least a part of the surface is coated with a coating layer including inorganic particles may be provided. Since the regenerated pellet has physical properties similar to those of a new polyolefin resin, it may be used in various industrial fields using a conventional new polyolefin resin as a raw material, and thus, its industrial advantages are excellent.

Hereinabove, the embodiments of the present invention have been described, but the present invention is not limited thereto, and those with ordinary skill in the art will understand that various changes and modification are possible within the range which is not out of the concept and the scope of the claims described later.

What is claimed is:

1. A method of continuously regenerating a separator including inorganic particles, the method comprising:
   impregnating a separator of which at least a part of the surface is coated with a coating layer including inorganic particles in a water tank, performing a surface polishing treatment of the impregnated separator using a polishing roller to release the coating layer coated on the surface of the separator; and
   drying the separator from which the coating layer has been released.

2. The method of continuously regenerating the separator including inorganic particles of claim 1, wherein the releasing of the coating layer coated on the surface of the separator further includes subjecting the separator to a sonication operation.

3. The method of continuously regenerating the separator including inorganic particles of claim 2, wherein the sonication operation is performed at a frequency of 10 to 50 kHz.

4. The method of continuously regenerating the separator including inorganic particles of claim 1, wherein the polishing roller includes one or more of (a) a substrate and (b) a brush,
   wherein the substrate includes a woven fabric, a non-woven fabric, a calendered non-woven fabric, a polymer film, a stitch bonded fabric, an open cell foam, or a closed cell foam on the surface; and
   wherein the brush includes an organic polymer fiber or an inorganic fiber as brush hair.

5. The method of continuously regenerating the separator including inorganic particles of claim 4, wherein the surface polishing treatment includes scrubbing the surface of the separator using one or two or more rolls of which at least a part of the surface has one or more of the substrate and the brush.

6. The method of continuously regenerating the separator including inorganic particles of claim 1, wherein the drying of the separator is performed at 50 to 150° C.

7. The method of continuously regenerating the separator including inorganic particles of claim 1, further comprising: after releasing of the coating layer coated on the surface of the separator, washing the separator from which the coating layer has been released.

8. The method of continuously regenerating the separator including inorganic particles of claim 1, wherein in the releasing of the coating layer coated on the surface of the separator, the separator is provided in a wound roll form, and the separator is unwound from the provided roll and impregnated in the water tank.

9. The method of continuously regenerating separator including inorganic particles of claim 1, further comprising: after releasing of the coating layer coated on the surface of the separator, obtaining the released coating layer.

10. The method of continuously regenerating the separator including inorganic particles of claim 9, further comprising: obtaining the inorganic particles from the obtained coating layer.

11. A method of manufacturing a regenerated pellet, the method comprising:
    impregnating a separator of which at least a part of the surface is coated with a coating layer including inorganic particles in a water tank, and then performing a surface polishing treatment of the impregnated separator using a polishing roller to release the coating layer coated on the separator;
    drying the separator from which the coating layer has been released;
    mixing the dried separator and a polyolefin-based resin; and
    melt-extruding the mixture of the separator and the polyolefin-based resin to manufacture a pellet.

12. The method of manufacturing the regenerated pellet of claim 11, wherein the releasing of the coating layer coated on the surface of the separator further includes a sonication operation.

13. The method of manufacturing the regenerated pellet of claim 11, wherein the separator is included at 10 to 90 wt % in the mixture based on the total weight of the mixture of the separator and the polyolefin-based resin.

14. The method of manufacturing the regenerated pellet of claim 11, wherein in the mixing of the dried separator and the polyolefin-based resin, a mixing temperature is 50 to 500° C.

15. The method of manufacturing the regenerated pellet of claim 11, wherein in the melt-extruding of the mixture of the separator and the polyolefin-based resin to manufacture a pellet, the mixture of the separator and the polyolefin-based resin is melt-extruded at 100 to 500° ° C.

16. A method of continuously regenerating a separator including inorganic particles, the method comprising:
    impregnating a separator of which at least a part of the surface is coated with a coating layer including inorganic particles in a water tank, performing a surface polishing treatment to release the coating layer coated on the surface of the separator; and
    drying the separator from which the coating layer has been released,
    wherein the surface polishing treatment includes employing as surface polishing means, one or more of (a) a substrate and (b) a brush,
    wherein the substrate includes a woven fabric, a non-woven fabric, a calendered non-woven fabric, a polymer film, a stitch bonded fabric, an open cell foam, or a closed cell foam on the surface;

wherein the brush includes an organic polymer fiber or an inorganic fiber as brush hair, and wherein the surface polishing treatment includes scrubbing the surface of the separator using one or two or more rolls of which at least a part of the surface has one or more of the substrate and the brush.

* * * * *